(12) United States Patent
Prasad et al.

(10) Patent No.: US 11,029,975 B2
(45) Date of Patent: Jun. 8, 2021

(54) AUTOMATED CONTAINER IMAGE ASSEMBLY

(71) Applicant: International Business Machines Corporation, Armonk, NY (US)

(72) Inventors: Sanjay Kumar Prasad, Bengaluru (IN); Divakar R. Mysore, Bengaluru (IN); Srinivas G. Kulkarni, Pune (IN); Balakrishnan Sreenivasan, Bengaluru (IN); Ashutosh Kumar, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/590,611

(22) Filed: Oct. 2, 2019

(65) Prior Publication Data

US 2021/0103450 A1    Apr. 8, 2021

(51) Int. Cl.
*G06F 9/445* (2018.01)
*G06F 21/57* (2013.01)

(52) U.S. Cl.
CPC ........ *G06F 9/44526* (2013.01); *G06F 21/577* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 9,367,305 B1 * | 6/2016 | Kumar | G06F 8/71 |
| 10,032,032 B2 * | 7/2018 | Suarez | G06F 21/577 |
| 10,073,974 B2 | 9/2018 | Hwang et al. | |
| 10,169,209 B2 | 1/2019 | McPherson et al. | |
| 10,534,671 B1 * | 1/2020 | Zhao | G06F 8/63 |
| 10,740,132 B2 * | 8/2020 | Goel | G06F 9/45558 |
| 2007/0118332 A1 * | 5/2007 | Meyers | G06Q 10/08 |
| | | | 702/182 |
| 2018/0025160 A1 * | 1/2018 | Hwang | G06F 8/71 |
| | | | 726/25 |
| 2018/0129479 A1 * | 5/2018 | McPherson | G06F 9/45558 |
| 2019/0026474 A1 * | 1/2019 | Adam | G06F 21/563 |
| 2019/0098068 A1 * | 3/2019 | Iliofotou | H04L 67/1002 |

FOREIGN PATENT DOCUMENTS

CN          106970822 A       7/2017

OTHER PUBLICATIONS

Wilder, "Squashing Docker Images", 2014, Squashing Docker Images at http://jasonwilder.com/blog/2014/08/19/squashing-docker-images/ (Year: 2014).*
Wilder, "Squashing Docker Images", 2014, Jason Wilder's Blog at http://jasonwilder.com/blog/2014/08/19/squashing-docker-images/ (Year: 2014).*

* cited by examiner

*Primary Examiner* — Hossain M Morshed
(74) *Attorney, Agent, or Firm* — Yee & Associates, P.C.

(57) ABSTRACT

Automatically generating a container image assembly file is provided. A definition of an application is assessed to determine a base container image and application libraries needed as add-ons for a container image corresponding to the application. A library dependency graph of flow from the base container image to add-on libraries for the application is generated. The container image assembly file is generated based on the library dependency graph of flow from the base container image to the add-on libraries for the application. Vulnerabilities corresponding to the add-on libraries of the container image assembly file are removed.

17 Claims, 5 Drawing Sheets

AUTOMATED CONTAINER IMAGE ASSEMBLY

BACKGROUND

1. Field

The disclosure relates generally to container images and more specifically to automatically generating a container image assembly file with vulnerabilities removed and with image size minimized.

2. Description of the Related Art

Application containerization is an operating system-level virtualization method used to deploy and run distributed applications without launching an entire virtual machine for each application. Multiple isolated applications or services run on a single host node and access the same operating system kernel. Application containers may work on bare-metal systems, cloud instances, and virtual machines, across different types of operating systems.

Application containers include runtime components, such as files, environment variables, and libraries, which are necessary to run the desired application. Application containers consume fewer resources than a comparable deployment on virtual machines because containers share resources without a full operating system to underpin each application. The complete set of information to execute in a container is a container image.

A container image is often a reusable component that is shared with different infrastructure and designed to run in various environments. To be widely interoperable, container images rely on open standards and operate across the different infrastructures. A container image is compiled from file system layers built onto a base container image. These layers encourage reuse of various components, so a user does not need to create everything from scratch for every project. The developer of a container image can update the image over time to introduce more functionality, fix bugs, or otherwise change the product. In addition, the developer can modify the container image to use it as the basis for a new container.

For increased automation, the set of layers are described by the user, and these are assembled into the container image. Each command in the file creates a new layer in the container image. Container images are stored in a registry that is either private or public on a repository. The container image developer pushes the image to a registry, and a user pulls the image when the user wants to run the image as a container. In other words, a running instance of an image is called a container. Some container images are purposefully minimal, while others have large file sizes.

SUMMARY

According to one illustrative embodiment, a computer-implemented method for automatically generating a container image assembly file is provided. A computer assesses a definition of an application to determine a base container image and application libraries needed as add-ons for a container image corresponding to the application. The computer generates a library dependency graph of flow from the base container image to add-on libraries for the application. The computer generates the container image assembly file based on the library dependency graph of flow from the base container image to the add-on libraries for the application. The computer removes vulnerabilities corresponding to the add-on libraries of the container image assembly file. According to other illustrative embodiments, a computer system and computer program product for automatically generating a container image assembly file are provided.

DETAILED DESCRIPTION

Figure 1:
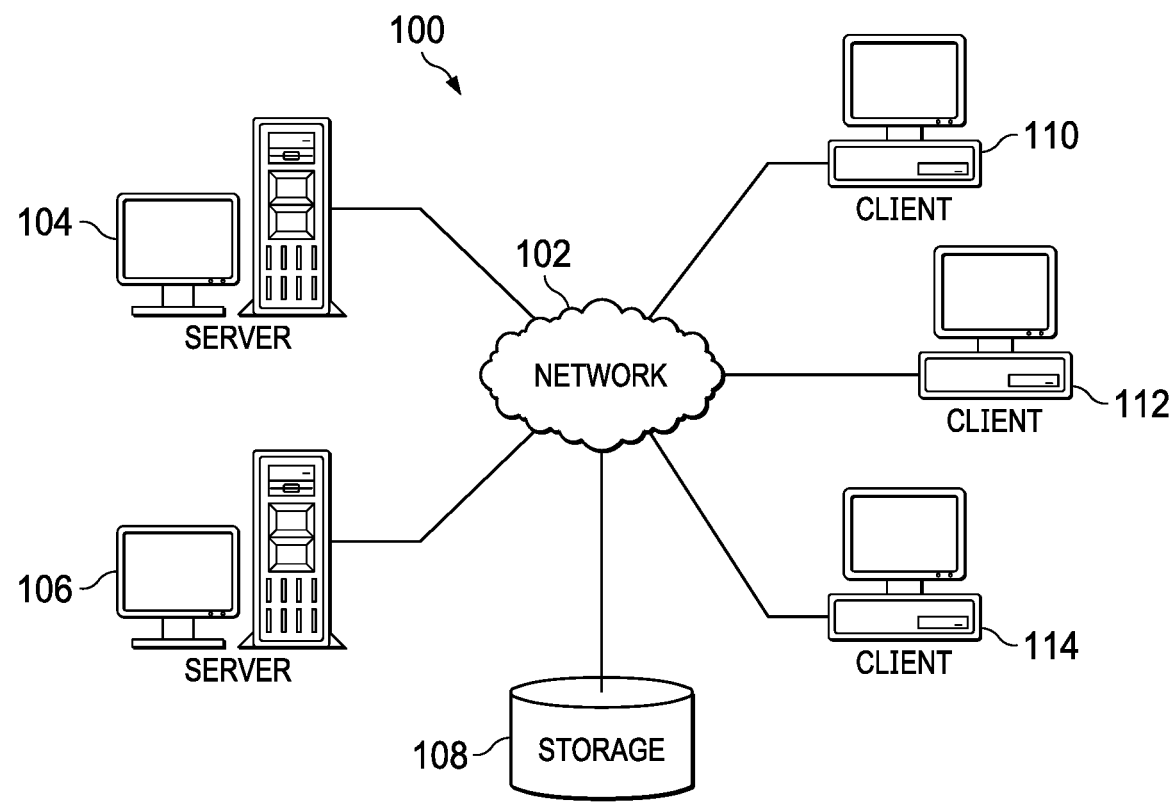
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
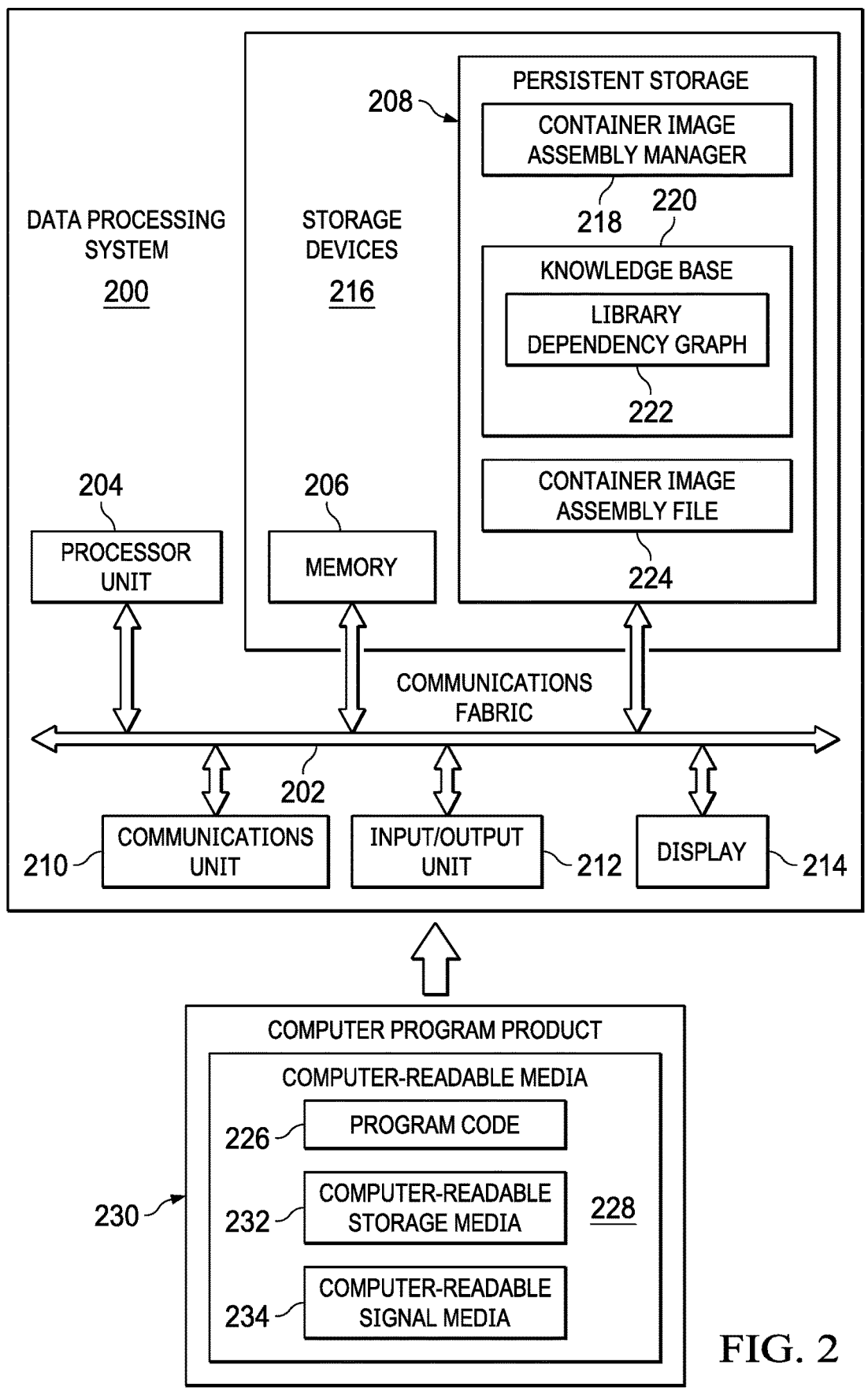
FIG. 2 is a diagram of a data processing system in which illustrative embodiments may be implemented.
Figure 3:
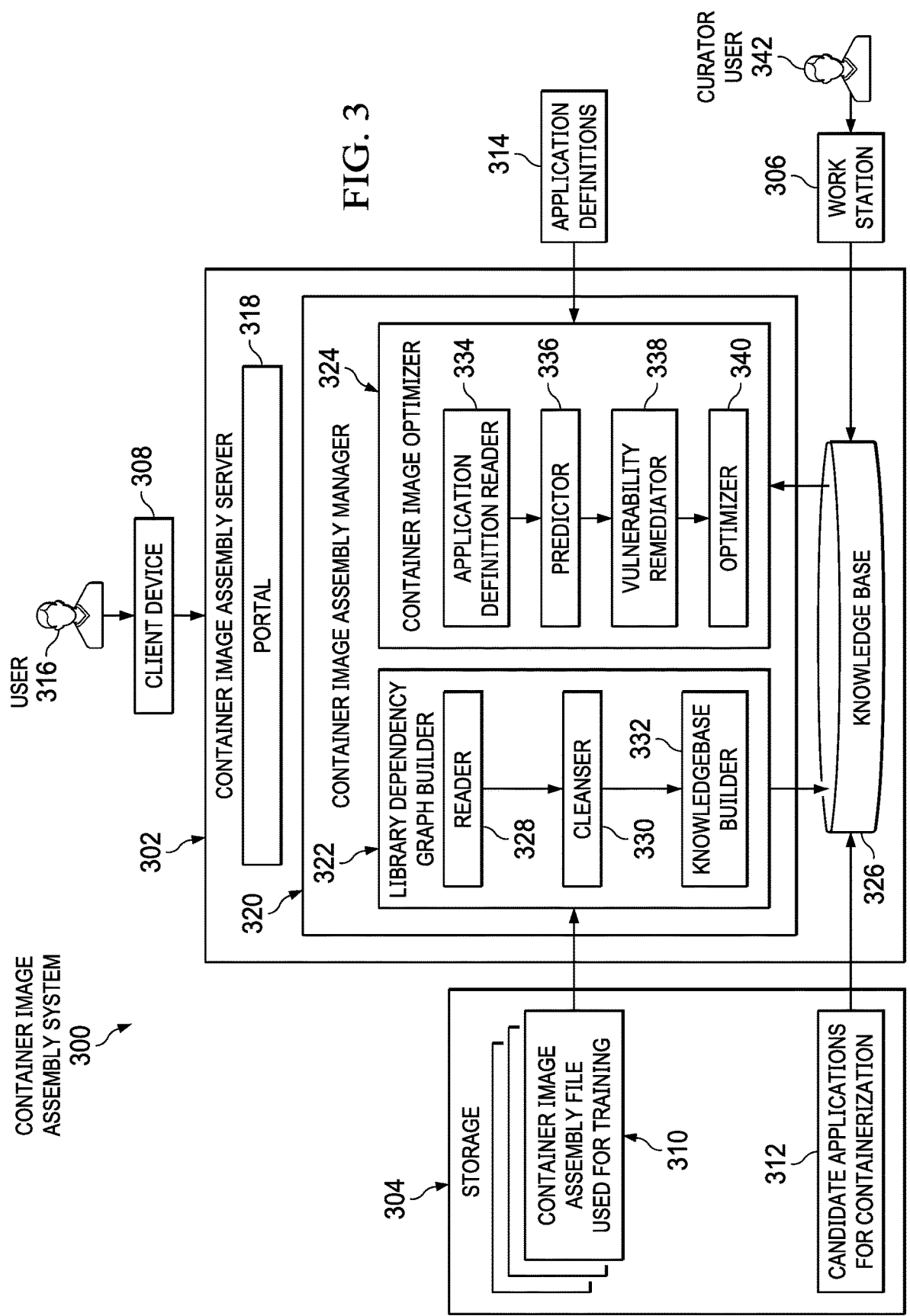
FIG. 3 is a diagram illustrating an example of a container image assembly system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide a service for automatically generating container image assembly files for client device users. Also, it should be noted that server 104 and server 106 may represent multiple computing nodes in one or more cloud environments. Alternatively, server 104 and server 106 may represent multiple computers in one or more data centers.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, and the like, with wire or wireless communication links to network 102. Users of clients 110, 112, and 114 may utilize clients 110, 112, and 114 to access and utilize the container image assembly file generation services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of different client devices, identifiers for a plurality of different users, historic container image assembly file data, historic application library dependency data, base container images, application libraries, and the like. Furthermore, storage 108 may store other types of data, such as authentication or credential data that may include user names, passwords, and biometric data associated with system administrators and client device users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard disk drive, a solid-state drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores container image assembly manager 218. However, it should be noted that even though container image assembly manager 218 is illustrated as residing in persistent storage 208, in an alternative illustrative embodiment container image assembly manager 218 may be a separate component of data processing system 200. For example, container image assembly manager 218 may be a hardware component coupled to communication fabric 202 or a combination of hardware and software components. In another alternative illustrative embodiment, a first set of components of container image assembly manager 218 may be located in data processing system 200 and a second set of components of container image assembly manager 218 may be located in a second data processing system, such as, for example, server 106 in FIG. 1.

Container image assembly manager 218 controls the process of automatically generating a container image assembly file with add-on library vulnerabilities removed and with container image size minimized (i.e., number of layers of the container image are reduced to a minimum number). Container image assembly manager 218 may be comprised of a plurality of different modules, such as, for example, a library dependency graph builder module, a knowledge base builder module, a container image optimizer module, a library vulnerability remediator module, and the like. Container image assembly manager 218 generates knowledge base 220, which contains library dependency graph 222, based on ingested historical container image assembly file data and application definition data from one or more remote storage devices, such as storage 108 in FIG. 1.

Knowledge base 220 stores information, such as, for example, historic container image assembly files, historic library dependency graphs, list of most common libraries for given container images, probabilities that particular libraries are needed by given container images, identification of precedent libraries, identification of dependent libraries, identification of most common sequence of library dependencies for given sets of libraries, identification of undesired lines to be removed from production container images, identification of containerizable applications, and the like. It should be noted that each path in library dependency graph 222 identifies a valid sequence of add-on library dependencies for an application. Also, library dependency graph 222 may represent one or more library dependency graphs for one or more applications.

Container image assembly manager 218 generates container image assembly file 224 based on the information contained within knowledge base 220 and library dependency graph 222. Container image assembly file 224 is a text file that defines how to generate a container image for a particular containerizable application using a base container image and a set of add-on libraries in dependency order. Further, container image assembly manager 218 may utilize container image assembly file 224 to generate the corresponding container image. Furthermore, container image assembly manager 218 may deploy the generated container image to a set of one or more host nodes in a production environment for running.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, short-wave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 226 is located in a functional form on computer readable media 228 that is selectively removable and may be loaded onto or transferred to data processing system 200 for running by processor unit 204. Program code 226 and computer readable media 228 form computer program product 230. In one example, computer readable media 228 may be computer readable storage media 232 or computer readable signal media 234. Computer readable storage media 232 may include, for example, an optical or magnetic disc that is inserted or placed into a drive or other device that is part of persistent storage 208 for transfer onto a storage device, such as a hard drive, that is part of persistent storage 208. Computer readable storage media 232 also may take the form of a persistent storage, such as a hard drive, a thumb drive, or a flash memory that is connected to data processing system 200. In some instances, computer readable storage media 232 may not be removable from data processing system 200.

Alternatively, program code 226 may be transferred to data processing system 200 using computer readable signal media 234. Computer readable signal media 234 may be, for example, a propagated data signal containing program code 226. For example, computer readable signal media 234 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 226 may be downloaded over a network to persistent storage 208 from another device or data processing system through computer readable signal media 234 for use within data processing system 200. For instance, program code stored in a computer readable storage media in a data processing system may be downloaded over a network from the data processing system to data processing system 200. The data processing system providing program code 226 may be a server computer, a client computer, or some other device capable of storing and transmitting program code 226.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 232 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

During cloud migration and deployment, many container image assembly files need to be generated. There are multiple components of container image assembly files and numerous combinations. It should be noted that application containerization is still an evolving field and knowledge regarding containerization is still being collected. However, it is imperative to generate container images that are most efficient.

Illustrative embodiments automate the process of generating container image assembly files, while ensuring that a size of a container image is minimized, that library vulnerabilities are removed from the container image, and that the time taken to build the container image is minimized. Illustrative embodiments utilize a two-phase approach. In the first phase, illustrative embodiments build a knowledge base of application library dependencies. In the second phases, illustrative embodiments automatically generate and optimize a container image assembly file.

While building the knowledge base of application library dependencies during the first phase, illustrative embodiments ingest container image assembly files (i.e., historical data) from storage using storage uniform resource locators. Illustrative embodiments generate a library dependency graph of flow from a base container image to add-on libraries based on the ingested historical container image assembly file data. Then, illustrative embodiments generate the knowledge base containing a dependency set of each add-on library and base container image/library associations. Afterward, a curator user can curate (e.g., organize and edit) the information in the knowledge base. Alternatively, illustrative embodiments may automatically curate the information in the knowledge base.

Considering a base container image and add-on libraries as activities (e.g., a sequence of library dependencies), illustrative embodiments generate the library dependency graph with bindings on splits and joins of the add-on libraries for each broad combination of the base container image. Illustrative embodiments generate the library dependency graph so that the graph does not have any loops. Thus, each path in the library dependency graph is a valid sequence of library dependencies.

It should be noted that illustrative embodiments may utilize available standard libraries for building the library dependency graph. However, illustrative embodiments may generate their own library dependency graph. For example, for each add-on library, illustrative embodiments may generate a vector with frequency of direct-follows relationships with every other add-on library vector. Then, illustrative embodiments draw an edge from a first node corresponding to a first library in the library dependency graph to a second node corresponding to a second library if the vector corresponding to the first library has a significant frequency of direct-follows relationship with the vector of the second library, but not the other way around (i.e., the vector of the second library does not have a significant frequency of direct-follows relationship with the vector corresponding to the first library).

If both libraries have a significant direct follows relationship with each other, then illustrative embodiments may model the first library as a concurrent node (i.e., AND split before and AND join after). For example, if library "1" is followed by library "2" sometimes and followed by library "3" sometimes, then illustrative embodiments model library 1 as an XOR split after the library 1 node in the library dependency graph. If library 1 follows library 2 sometimes and follows library 3 sometimes, then illustrative embodiments model library 1 as an XOR join before the library 2 node and the library 3 node in the library dependency graph.

After creating the library dependency graph, illustrative embodiments also include other data in the graph, such as, for example: which are the most common libraries for a given base container image and the probability that these libraries are needed by the given base container image; which libraries are precedent libraries (i.e., needed before a given library); which libraries are dependent libraries (i.e., used after a given library); what is the most common sequence of library dependencies for a given set of libraries; which libraries are mostly contained within a given layer of a given base container image; frequency of change or rebuild of each given library; and the like.

While automatically generating and optimizing a container image assembly file during the second phase, illustrative embodiments select a base container image variant and add-on libraries, prepare an initial container image assembly file, and optimize layers of the container image. When selecting a base image variant and add-on libraries, illustrative embodiments generate a list of needed add-on libraries based on assessment of the definition of the application. In addition, illustrative embodiments derive a list of needed additional add-on libraries based on information in the knowledge base.

For each selected base container image variant, illustrative embodiments generate a list of application libraries needed as add-ons. Illustrative embodiments determine that the list of application libraries needed as add-ons is complete based on analyzing information regarding the selected base container image variant and information in the knowledge base regarding the additional libraries needed as add-ons. Then, illustrative embodiments compute a total size of the container image and identify a base container image variant with a minimum or smallest size (i.e., smallest number of layers). In case of a tie among base container image variants having a minimum size, illustrative embodiments select the base container image variant that has the most component functions. Afterward, illustrative embodiments recommend the base container image variant having the minimum size and the generated list of libraries needed as add-ons.

When preparing the initial container image assembly file, illustrative embodiments utilize the selected base image variant with minimum size and the generated list of libraries needed as add-ons. Further, based on information in the knowledge base, illustrative embodiments assign a sequence number to each add-on library in the list. Furthermore, illustrative embodiments generate the container image assembly file by adding one layer for each add-on library in the list to the container image.

When optimizing layers of the container image, illustrative embodiments remove vulnerabilities corresponding to the application libraries. Moreover, illustrative embodiments recommend replacements for vulnerable container images by providing alternate paths for installation of application add-on libraries with vulnerabilities removed. Illustrative embodiments also merge multiple sequential layers of the initial container image assembly file based on rules, such as, for example, affinity of files in those layers according to information in the knowledge base, size of a layer after merging layers does not exceed a pre-defined layer size, and any other rule defined by the developer. Furthermore, illustrative embodiments can add most frequently changed layers (e.g., determined by information in the knowledge base) after less frequently changed layers taking into consideration library dependencies.

Thus, illustrative embodiments provide one or more technical solutions that overcome a technical problem with automatically generating a container image assembly file with library vulnerabilities removed and with image size minimized. As a result, these one or more technical solutions provide a technical effect and practical application in the field of distributed applications.

With reference now to FIG. 3, a diagram illustrating an example of a container image assembly system is depicted in accordance with an illustrative embodiment. Container image assembly system 300 may be implemented in a network of data processing systems, such as network data processing system 100 in FIG. 1. Container image assembly system 300 is a system of hardware and software components for automatically generating an optimized container image assembly file.

In this example, container image assembly system 300 includes container image assemble server 302, storage 304, work station 306, and client device 308. Container image assemble server 302 may be, for example, server 104 in FIG. 1 or data processing system 200 in FIG. 2. Storage 304 may be, for example, storage 108 in FIG. 1. Work station 306 and client device 308 may be, for example, client 100 and client 112 in FIG. 1.

Storage 304 stores container image assembly files 310. Container image assembly files 310 represent a plurality of different historical container image assembly files (i.e., previously generated container image assembly files corresponding to different applications). Storage 304 also stores candidate applications for containerization 312. Candidate applications for containerization 312 represents a list of distributed applications that are containerizable by container image assembly server 302. In addition, storage 304 stores application definitions 314 even though not illustrated as such in this example. Application definitions 314 provide definitions for each particular application listed in candidate applications for containerization 312. An application definition for a particular application identifies a base container image and a set of application libraries needed as add-ons for a container image corresponding to that particular application.

User 316 represents a person who is responsible for generating a container image assembly file for a particular candidate application using container image assembly server 302. User 316 utilizes client device 308 to access and utilize the services provided by container image assembly server 302 via portal 318.

Container image assembly server 302 includes container image assembly manager 320 and knowledge base 326. Container image assembly server 302 utilizes container image assembly manager 320, such as, for example, container image assembly manager 218 in FIG. 2, to automatically generate and optimize the container image assembly file, such as, for example, container image assembly file 224 in FIG. 2, for the particular candidate application.

In this example, container image assembly manager 320 includes library dependency graph builder 322 and container image optimizer 324, each of which are comprised of a plurality of components. However, it should be noted that container image assembly manager 320 may include more or fewer components than illustrated. For example, one component may be divided into two or more components, two or more components may be combined into one component, one or more components may be removed, or one or more components not illustrated may be added.

Container image assembly manager 320 utilizes library dependency graph builder 322 to generate library dependency graphs for respective applications, such as library dependency graph 222 in FIG. 2. Library dependency graph builder 322 includes reader 328, cleanser 330, and knowledge base builder 332.

Library dependency graph builder 322 utilizes reader 328 to read container image assembly files 310 as individual files or as a bulk upload. Reader 328 may consume container image assembly files 310 from storage 304 using, for example, uniform resource locators.

Library dependency graph builder 322 utilizes cleanser 330 to remove comments from container image assembly files 310. In addition, cleanser 330 organizes lines of container image assembly files 310 in a desired format for parsing.

Library dependency graph builder 322 utilizes knowledge base builder 332 to generate data structures for libraries corresponding to respective applications. Knowledge base builder 332 generates knowledge base 326 of library dependencies based on ingested container image assembly file data corresponding to respective applications and any received user feedback corresponding to container image assembly file optimizations. Knowledge base builder 332 also generates traversal logic for the application libraries. It should be noted that traversal for each edge in a library dependency graph ends on an application library as a leaf node. Knowledge base builder 332 generates a library dependency graph for multistage builds from generated application library data structures. Knowledge base builder 332 stores trained library dependency graphs in knowledge base 326 for adding the right add-on libraries, providing multi-stage builds, and discovering vulnerabilities in libraries. Curator user 342 may utilize work station 306 to curate (e.g., organize and edit) the information contained within knowledge base 326, which was built by knowledge base builder 332.

Container image assembly manager 320 utilizes container image optimizer 324 to optimize generated container image assembly files. Container image optimizer 324 includes application definition reader 334, predictor 336, vulnerability remediator 338, and optimizer 340.

Container image optimizer 324 utilizes application definition reader 334 to read application definitions 314 to find out which add-on libraries are needed by respective applications. These add-on libraries are leaf nodes in data structures of the library dependency graphs generated by library dependency graph builder 322 during graph training. A user, such as user 316, feeds application definitions 314 into container image assembly manager 320. Application definitions 314 for respective applications consist of a base container image and libraries needed by a respective application.

Container image optimizer 324 utilizes predictor 336, based on information in knowledge base 326, to: retrieve add-on libraries identified in a respective application definition and to predict an optimum path (i.e., set of container image assembly file lines) to install those add-on libraries; recommend multi-stage builds; recommend removal of undesired lines from a production container image (e.g., lines that were included in a container image used for testing in a testing environment, but those lines are not needed in the container image when executing in a production environment); and recommend a need for supplemental files, which may take care of housekeeping activities, such as, for example, system logging.

Container image optimizer 324 utilizes vulnerability remediator 338, based on information in knowledge base 326, to recommend replacements for container images having library vulnerabilities by providing alternate paths for installation of add-on libraries with vulnerabilities removed. Container image optimizer 324 utilizes optimizer 340, based on information in knowledge base 326, to: generate multiple container image assembly files using different base container images and a set of needed add-on libraries; compare build time and size of the different container images; and output an optimal set of instructions needed in a respective container image assembly file.

Knowledge base 326 is a persistent storage for trained library dependency graphs and various derived features of those graphs. Knowledge base 326 also persists information regarding candidate applications for containerization 312. Further, knowledge base 326 stores information on which applications are containerizable and which are not.

Figure 4:
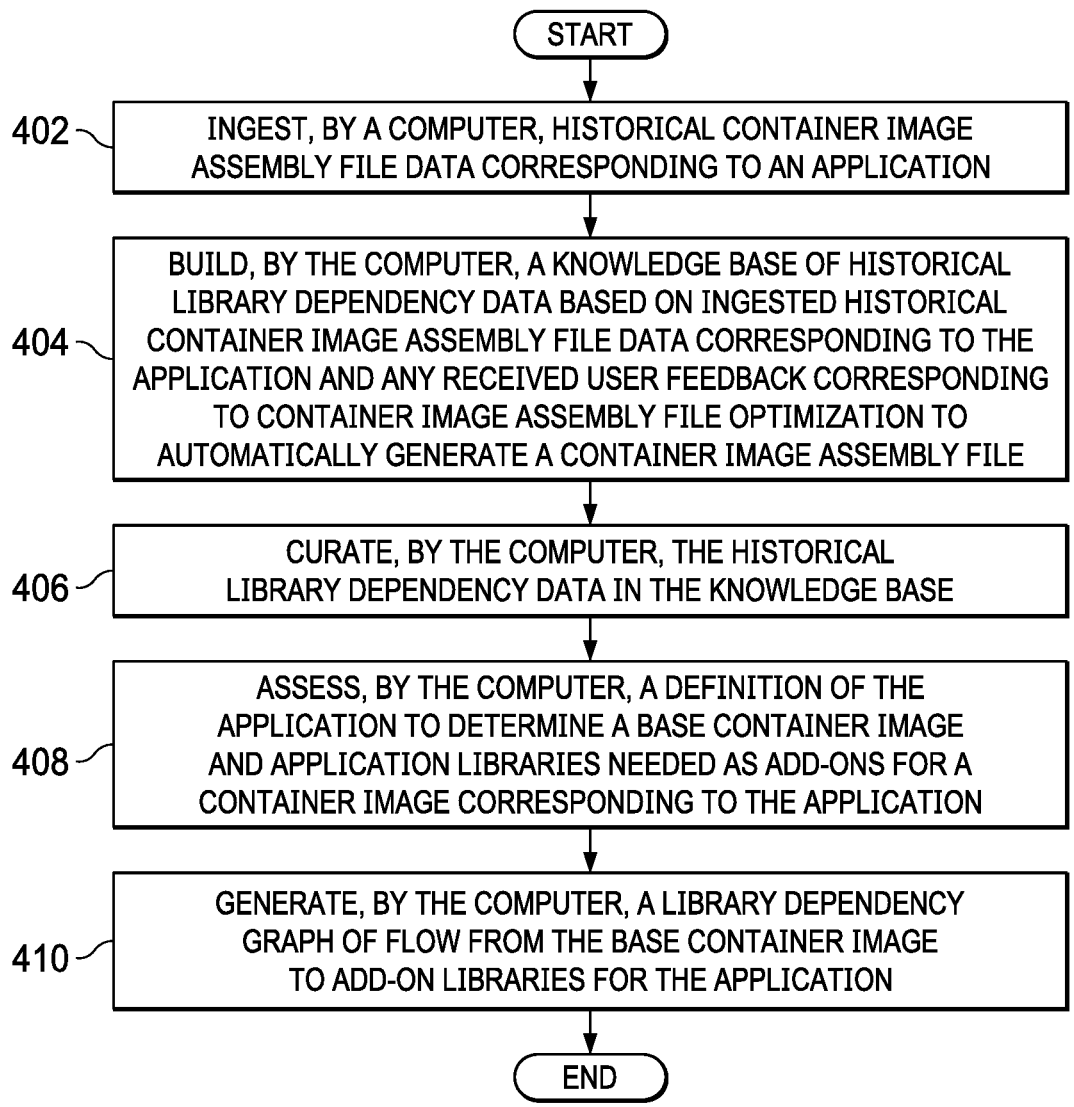
FIG. 4 is a flowchart illustrating a process for building a knowledge base of library dependencies in accordance with an illustrative embodiment.

With reference now to FIG. 4, a flowchart illustrating a process for building a knowledge base of library dependencies is shown in accordance with an illustrative embodiment. The process shown in FIG. 4 may be implemented in a computer, such as, for example, server 104 in FIG. 1, data processing system 200 in FIG. 2, or container image assembly server 302 in FIG. 3.

The process begins when the computer ingests historical container image assembly file data corresponding to an application (step 402). The computer builds a knowledge base of historical library dependency data based on ingested historical container image assembly file data corresponding to the application and any received user feedback corresponding to container image assembly file optimization to automatically generate a container image file assembly (step 404). It should be noted that the user feedback is received in step 512 of FIG. 5. The computer curates the historical library dependency data in the knowledge base (step 406).

The computer assesses a definition of the application to determine a base container image and application libraries needed as add-ons for a container image corresponding to the application (step 408). The computer generates a library dependency graph of flow from the base container image to add-on libraries for the application (step 410). Thereafter, the process terminates.

Figure 5:
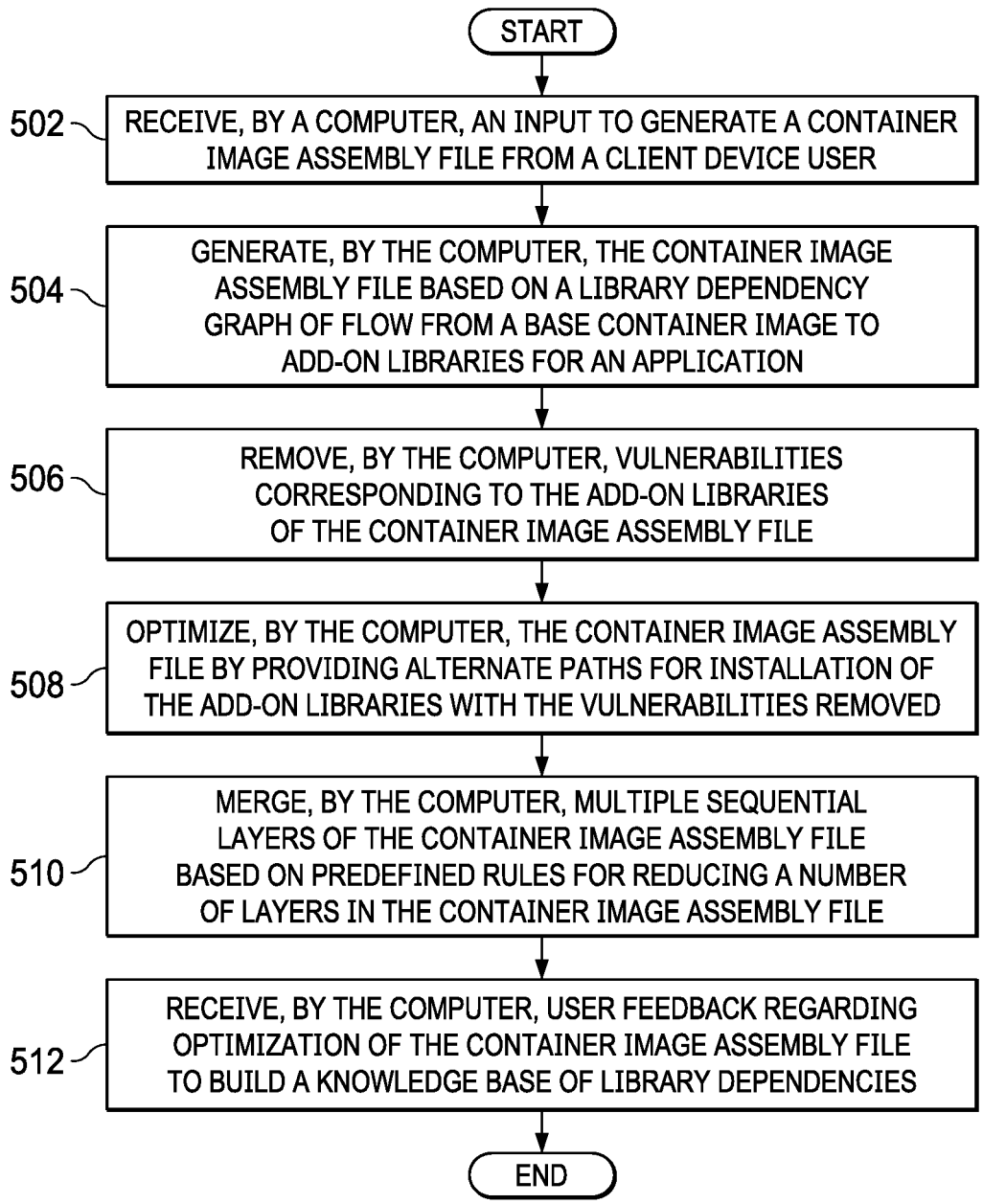
FIG. 5 is a flowchart illustrating a process for generating container image assembly files in accordance with an illustrative embodiment.

With reference now to FIG. 5, a flowchart illustrating a process for generating container image assembly files is shown in accordance with an illustrative embodiment. The process shown in FIG. 5 may be implemented in a computer, such as, for example, server 104 in FIG. 1, data processing system 200 in FIG. 2, or container image assembly server 302 in FIG. 3.

The process begins when the computer receives an input to generate a container image assembly file from a client device user (step 502). The computer generates the container image assembly file based on a library dependency graph of flow from a base container image to add-on libraries for an application (step 504). The computer retrieves the library dependency graph from a knowledge base of library dependencies. The computer removes vulnerabilities corresponding to the add-on libraries of the container image assembly file (step 506).

The computer optimizes the container image assembly file by providing alternate paths for installation of the add-on libraries with the vulnerabilities removed (step 508). The computer further optimizes the container image assembly file by merging multiple sequential layers of the container image assembly file based on predefined rules for reducing a number of layers in the container image assembly file (step 510). The predefined rules include file affinity in sequential layers according to information in the knowledge base, size of a layer after merging layers not exceeding a predefined layer size, and any user-defined rules. It should be noted that reducing the number of layers reduces the time it takes to bring up the container image for running. Furthermore, the computer receives user feedback regarding optimization of the container image assembly file to further build the knowledge base of library dependencies (step 512). Thereafter, the process terminates.

Thus, illustrative embodiments of the present invention provide a computer-implemented method, computer system, and computer program product for automatically generating a container image assembly file with library vulnerabilities removed and with container image size minimized. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically generating a container image assembly file, the computer-implemented method comprising:
    assessing, by a computer, a definition of an application to determine a base container image and application libraries needed as add-ons for a container image corresponding to the application;
    generating, by the computer, a library dependency graph of flow from the base container image to add-on libraries for the application;
    generating, by the computer, the container image assembly file based on the library dependency graph of flow from the base container image to the add-on libraries for the application;
    removing, by the computer, vulnerabilities corresponding to the add-on libraries of the container image assembly file;
    ingesting, by the computer, historical container image assembly file data corresponding to the application;
    building, by the computer, a knowledge base of historical library dependency data based on ingested historical container image assembly file data corresponding to the application and received user feedback corresponding to container image assembly file optimization to automatically generate the container image assembly file; and
    curating, by the computer, the historical library dependency data in the knowledge base.

2. The computer-implemented method of claim 1 further comprising:
    optimizing, by the computer, the container image assembly file that was generated based on the library dependency graph of flow from the base container image to the add-on libraries for the application by providing alternate paths for installation of the add-on libraries with the vulnerabilities removed.

3. The computer-implemented method of claim 1 further comprising:
    optimizing, by the computer, the container image assembly file that was generated based on the library dependency graph of flow from the base container image to the add-on libraries for the application by merging multiple sequential layers of the container image assembly file based on predefined rules for reducing a number of layers in the container image assembly file, wherein the predefined rules are selected from a group consisting of file affinity in sequential layers according to information in a knowledge base, size of a layer after merging layers not exceeding a predefined layer size, and user-defined rules.

4. The computer-implemented method of claim 1 further comprising:
    generating, by the computer, a container image for the application using the container image assembly file that was generated based on the library dependency graph of flow from the base container image to the add-on libraries for the application.

5. The computer-implemented method of claim 4 further comprising:
    deploying, by the computer, the container image to a set of host nodes in a production environment for running.

6. The computer-implemented method of claim 1 further comprising:
generating, by the computer, a vector for each respective add-on library with frequency of direct-follows relationships with every other add-on library vector.

7. The computer-implemented method of claim 1 further comprising:
generating, by the computer, the library dependency graph with bindings on splits and joins of the add-on libraries for each broad combination of the base container image, wherein each path in the library dependency graph is a valid sequence of library dependencies.

8. The computer-implemented method of claim 1, wherein the library dependency graph identifies most common libraries for a given base container image and a probability that these libraries are needed by the given base container image, precedent libraries, dependent libraries, most common sequence of library dependencies for a given set of libraries, libraries contained within a given layer of the given base container image, and frequency of change or rebuild of each given library.

9. A computer system for automatically generating a container image assembly file, the computer system comprising:
a bus system;
a storage device connected to the bus system, wherein the storage device stores program instructions; and
a processor connected to the bus system, wherein the processor executes the program instructions to:
assess a definition of an application to determine a base container image and application libraries needed as add-ons for a container image corresponding to the application;
generate a library dependency graph of flow from the base container image to add-on libraries for the application;
generate the container image assembly file based on the library dependency graph of flow from the base container image to the add-on libraries for the application;
remove vulnerabilities corresponding to the add-on libraries of the container image assembly file;
ingest historical container image assembly file data corresponding to the application;
build a knowledge base of historical library dependency data based on ingested historical container image assembly file data corresponding to the application and received user feedback corresponding to container image assembly file optimization to automatically generate the container image assembly file; and
curate the historical library dependency data in the knowledge base.

10. The computer system of claim 9, wherein the processor further executes the program instructions to:
optimize the container image assembly file that was generated based on the library dependency graph of flow from the base container image to the add-on libraries for the application by providing alternate paths for installation of the add-on libraries with the vulnerabilities removed.

11. The computer system of claim 9, wherein the processor further executes the program instructions to:
optimize the container image assembly file that was generated based on the library dependency graph of flow from the base container image to the add-on libraries for the application by merging multiple sequential layers of the container image assembly file based on predefined rules for reducing a number of layers in the container image assembly file, wherein the predefined rules are selected from a group consisting of file affinity in sequential layers according to information in a knowledge base, size of a layer after merging layers not exceeding a predefined layer size, and user-defined rules.

12. The computer system of claim 9, wherein the processor further executes the program instructions to:
generate a container image for the application using the container image assembly file that was generated based on the library dependency graph of flow from the base container image to the add-on libraries for the application.

13. A computer program product for automatically generating a container image assembly file, the computer program product comprising a computer readable storage medium having program instructions embodied therewith, the program instructions executable by a computer to cause the computer to perform a method comprising:
assessing, by the computer, a definition of an application to determine a base container image and application libraries needed as add-ons for a container image corresponding to the application;
generating, by the computer, a library dependency graph of flow from the base container image to add-on libraries for the application;
generating, by the computer, the container image assembly file based on the library dependency graph of flow from the base container image to the add-on libraries for the application;
removing, by the computer, vulnerabilities corresponding to the add-on libraries of the container image assembly file;
ingesting, by the computer, historical container image assembly file data corresponding to the application;
building, by the computer, a knowledge base of historical library dependency data based on ingested historical container image assembly file data corresponding to the application and received user feedback corresponding to container image assembly file optimization to automatically generate the container image assembly file; and
curating, by the computer, the historical library dependency data in the knowledge base.

14. The computer program product of claim 13 further comprising:
optimizing, by the computer, the container image assembly file that was generated based on the library dependency graph of flow from the base container image to the add-on libraries for the application by providing alternate paths for installation of the add-on libraries with the vulnerabilities removed.

15. The computer program product of claim 13 further comprising:
optimizing, by the computer, the container image assembly file that was generated based on the library dependency graph of flow from the base container image to the add-on libraries for the application by merging multiple sequential layers of the container image assembly file based on predefined rules for reducing a number of layers in the container image assembly file, wherein the predefined rules are selected from a group consisting of file affinity in sequential layers according to information in a knowledge base, size of a layer after merging layers not exceeding a predefined layer size, and user-defined rules.

16. The computer program product of claim 13 further comprising:
   generating, by the computer, a container image for the application using the container image assembly file that was generated based on the library dependency graph of flow from the base container image to the add-on libraries for the application.

17. The computer program product of claim 16 further comprising:
   deploying, by the computer, the container image to a set of host nodes in a production environment for running.

\* \* \* \* \*